(12) United States Patent
Ogawa et al.

(10) Patent No.: US 10,571,553 B2
(45) Date of Patent: Feb. 25, 2020

(54) SENSOR MOUNTING STATE DETERMINATION DEVICE AND SENSOR MOUNTING STATE DETERMINATION METHOD

(71) Applicant: PANASONIC INTELLECTUAL PROPERTY MANAGEMENT CO., LTD., Osaka (JP)

(72) Inventors: Shinya Ogawa, Kanagawa (JP); Toru Ichikawa, Tokyo (JP); Tatsuaki Yamagishi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/131,928

(22) Filed: Sep. 14, 2018

(65) Prior Publication Data

US 2019/0018122 A1 Jan. 17, 2019

Related U.S. Application Data

(63) Continuation of application No. PCT/JP2017/005215, filed on Feb. 14, 2017.

(30) Foreign Application Priority Data

Mar. 18, 2016 (JP) ................. 2016-055134

(51) Int. Cl.
*G01S 7/52* (2006.01)
*G01S 15/08* (2006.01)
*G01S 15/931* (2020.01)

(52) U.S. Cl.
CPC .......... *G01S 7/52004* (2013.01); *G01S 15/08* (2013.01); *G01S 15/931* (2013.01); *G01S 2015/937* (2013.01); *G01S 2015/938* (2013.01)

(58) Field of Classification Search
CPC ........ G01S 7/52; G01S 15/93; G01S 7/52004; G01S 15/931; G01S 15/08; G01S 2015/937; G01S 2015/938
See application file for complete search history.

(56) References Cited

U.S. PATENT DOCUMENTS

| 4,542,489 A | 9/1985 | Naruse |
| 5,235,315 A * | 8/1993 | Cherry .................. B60Q 9/008 340/435 |

(Continued)

FOREIGN PATENT DOCUMENTS

| JP | 57-175266 | 10/1982 |
| JP | 58-026283 | 2/1983 |

(Continued)

OTHER PUBLICATIONS

Official Communication issued in International WIPO Pat. Appl. No. PCT/JP2017/005215, dated Apr. 18, 2017.

*Primary Examiner* — Hovhannes Baghdasaryan
*Assistant Examiner* — Amie M Ndure
(74) *Attorney, Agent, or Firm* — Greenblum & Bernstein, P.L.C.

(57) ABSTRACT

A sensor mounting state determination device includes distance measurement section that measures a distance to a road surface based on time from transmission of a transmission wave to reception of a reflection wave by an ultrasonic sensor that is mounted to a vehicle to transmit a transmission wave toward a road surface and receive a reflection wave reflected off the road surface. There is further provided a determination section configured to determine not only that the ultrasonic sensor is correctly mounted when the distance measured by the distance measurement section is identical to a predetermined distance, but also that the ultrasonic sensor is incorrectly mounted when the distance measured by the (Continued)

distance measurement section is not identical to the predetermined distance.

20 Claims, 5 Drawing Sheets

(56) References Cited

U.S. PATENT DOCUMENTS

| | | | | |
|---|---|---|---|---|
| 7,164,117 | B2* | 1/2007 | Breed | B60R 21/01516 |
| | | | | 250/208.1 |
| 8,760,962 | B2 | 6/2014 | Kloss | |
| 2005/0046584 | A1* | 3/2005 | Breed | B60C 11/24 |
| | | | | 340/13.31 |
| 2006/0208169 | A1* | 9/2006 | Breed | B60N 2/002 |
| | | | | 250/221 |
| 2012/0275263 | A1* | 11/2012 | Kloss | G01S 7/52004 |
| | | | | 367/13 |
| 2016/0334505 | A1 | 11/2016 | Naruse et al. | |

FOREIGN PATENT DOCUMENTS

| | | |
|---|---|---|
| JP | 58-216972 | 12/1983 |
| JP | 02-196988 | 8/1990 |
| JP | 09-178837 | 7/1997 |
| JP | 3054798 | 6/2000 |
| JP | 2010-286417 | 12/2010 |
| WO | 2015/118804 | 8/2015 |

* cited by examiner

SENSOR MOUNTING STATE DETERMINATION DEVICE AND SENSOR MOUNTING STATE DETERMINATION METHOD

CROSS-REFERENCE TO RELATED APPLICATIONS

This application is a continuation of the PCT International Application No. PCT/JP2017/005215 filed on Feb. 14, 2017, which claims the benefit of foreign priority of Japanese patent application No. 2016-055134 filed on Mar. 18, 2016, the contents all of which are incorporated herein by reference.

BACKGROUND

1. Technical Field

The present disclosure relates to a sensor mounting state determination device and a sensor mounting state determination method.

2. Description of the Related Art

Conventionally, there are known obstacle detectors each mounted to a vehicle such as an automobile, including a detector provided with an ultrasonic sensor (sonar) mounted to a rear portion of a vehicle to detect an obstacle existing behind the vehicle (e.g., refer to for example, Japanese Unexamined Patent Publication No. H9-178837).

This kind of obstacle detector allows the ultrasonic sensor to transmit ultrasound (transmission wave). When an obstacle exists within an attainment range of the ultrasound, the ultrasound hits against and reflects off the obstacle, and then the ultrasonic sensor receives the reflected ultrasound (reflected wave). When the ultrasonic sensor receives the reflected wave, a distance to the obstacle is calculated based on time from transmission of the ultrasound to reception thereof.

SUMMARY

The present disclosure provides a sensor mounting state determination device and a sensor mounting state determination method, capable of allowing a driver to determine whether an ultrasonic sensor is correctly mounted without actually checking it.

The sensor mounting state determination device according to the present disclosure includes a distance measurement section, and a determination section.

The distance measurement section measures a distance to a road surface based on time from transmission of a transmission wave to reception of a reflected wave by an ultrasonic sensor that is mounted to a vehicle to transmit a transmission wave toward a road surface and receive a reflected wave reflected off the road surface. The determination section determines not only that the ultrasonic sensor is correctly mounted when the distance measured by the distance measurement section is identical to a predetermined distance, but also that the ultrasonic sensor is incorrectly mounted when the distance measured by the distance measurement section is not identical to the predetermined distance.

The sensor mounting state determination method according to the present disclosure is configured to measure a distance to a road surface based on time from transmission of a transmission wave to reception of a reflected wave by an ultrasonic sensor that is mounted to a vehicle to transmit a transmission wave toward a road surface and receive a reflected wave reflected off the road surface. It is determined not only that the ultrasonic sensor is correctly mounted when the distance measured is identical to the predetermined distance, but also that the ultrasonic sensor is incorrectly mounted when the distance measured is not identical to the predetermined distance.

The present disclosure enables a driver to determine whether an ultrasonic sensor is correctly mounted without actually checking it.

DETAILED DESCRIPTION OF PREFERRED EMBODIMENTS

Prior to describing exemplary embodiments of the present disclosure, a problem of the conventional device is briefly described. Depending on a mounted state (e.g., a mounted angle) of an ultrasonic sensor to a vehicle, even when an obstacle actually exists behind a vehicle, the obstacle may not be correctly detected. For example, ultrasound transmitted from the ultrasonic sensor may not hit against an obstacle, or even ultrasound having hit against and reflected off an obstacle may not reach the ultrasonic sensor. This causes a problem that a driver sometimes needs to actually check whether the ultrasonic sensor is correctly mounted. This kind of check operation is very troublesome.

Figure 1:
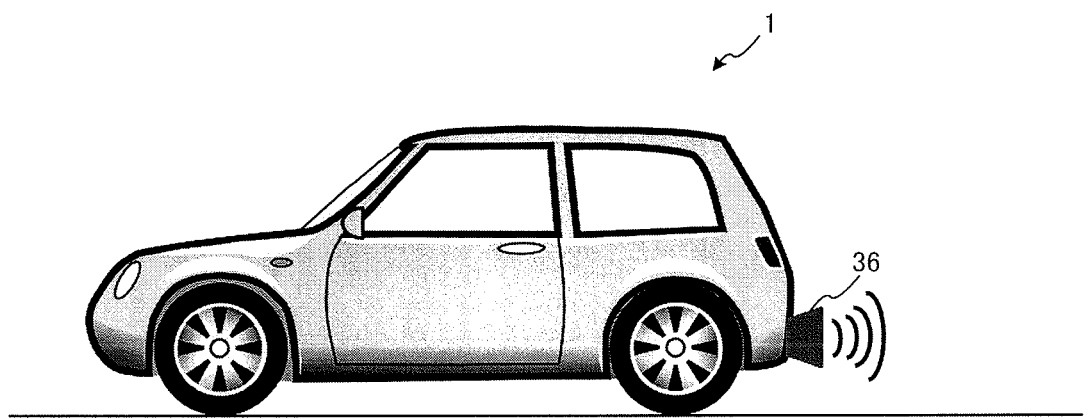
FIG. 1 is a side view of a vehicle provided with an ultrasonic sensor according to an exemplary embodiment of the present disclosure.
Figure 2:
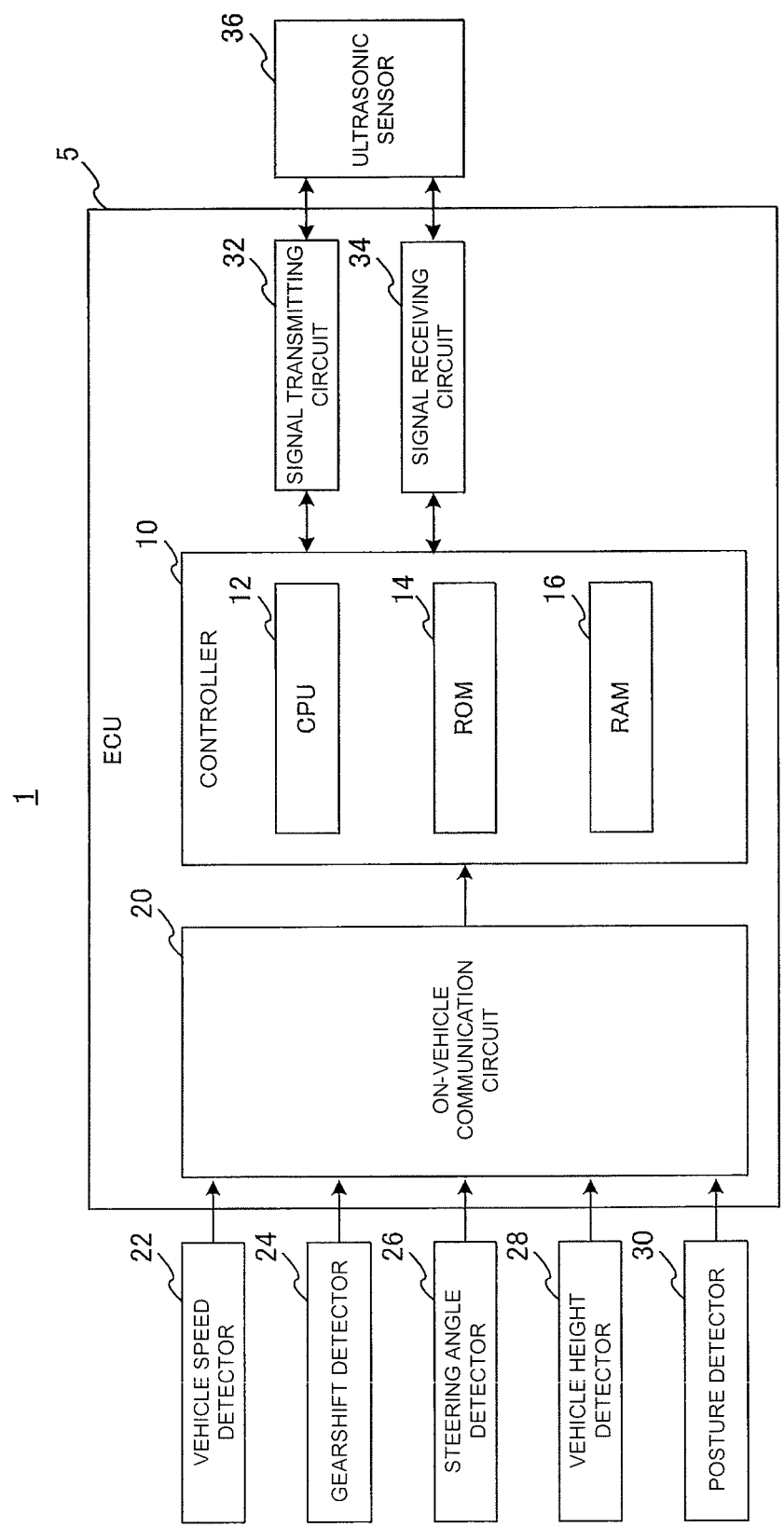
FIG. 2 is a block diagram illustrating a configuration of main functional units of a vehicle according to the exemplary embodiment of the present disclosure.

Exemplary embodiments of the present disclosure will be described in detail below with reference to drawings. FIG. 1 illustrates a vehicle provided with an ultrasonic sensor according to the present exemplary embodiment. FIG. 2 is a block diagram illustrating a configuration of main functional units of a vehicle according to the present exemplary embodiment.

As illustrated in FIG. 1, ultrasonic sensor 36 is attached to a rear portion of vehicle 1 (e.g., near a rear damper) to detect an obstacle existing behind the vehicle. The obstacle is not limited to an object such as a wall or a curb, and includes a little child or the like, playing behind vehicle 1.

As illustrated in FIG. 2, vehicle 1 includes ultrasound distance measurement electronic control unit (ECU) 5, vehicle speed detector 22, gearshift detector 24, steering angle detector 26, vehicle height detector 28, and posture detector 30. Ultrasound distance measurement ECU 5 corresponds to the "sensor mounting state determination device" of the present disclosure.

Vehicle speed detector 22 detects vehicle speed being running speed of vehicle 1, and transmits a detection result of the vehicle speed to ultrasound distance measurement ECU 5.

Gearshift detector 24 detects a shift position (shift range) of a shift lever (not illustrated), and transmits a detection result of the shift position to ultrasound distance measurement ECU 5. In the present exemplary embodiment, the shift position is configured to be changed in an order of parking (P), reverse (R), neutral (N), and drive (D).

Steering angle detector 26 detects a rotation angle of a steering shaft (not illustrated) as a steering angle, and transmits a detection result of the rotation angle to ultrasound distance measurement ECU 5.

Vehicle height detector 28 detects a vehicle height being a height of vehicle 1, and transmits a detection result of the vehicle height to ultrasound distance measurement ECU 5.

Posture detector 30 detects a posture of vehicle 1 with a 3D gyroscope sensor (three-axis gyroscope sensor), for example, and transmits a detection result of the posture to ultrasound distance measurement ECU 5. Specifically, posture detector 30 detects direction and inclination of vehicle 1 in accordance with angular velocity detected by the 3D gyroscope sensor.

Ultrasound distance measurement ECU 5 includes controller 10, on-vehicle communication circuit 20, signal transmitting circuit 32, and signal receiving circuit 34.

Controller 10 includes working memories such as central processing unit (CPU) 12, read only memory (ROM) 14, and random access memory (RAM) 16. CPU 12 reads an ultrasound distance measurement program from ROM 14 to develop the program in RAM 16, and controls operation of each block of ultrasound distance measurement ECU 5 in conjunction with the developed ultrasound distance measurement program. Controller 10 serves as the "distance measurement section" and the "determination section" of the present disclosure.

On-vehicle communication circuit 20 is connected to vehicle speed detector 22, gearshift detector 24, steering angle detector 26, vehicle height detector 28, and posture detector 30, via an on-vehicle communication network. On-vehicle communication circuit 20 receives a detection result transmitted from each of vehicle speed detector 22, gearshift detector 24, steering angle detector 26, vehicle height detector 28, and posture detector 30, and outputs the detection result to controller 10.

Signal transmitting circuit 32 is configured to transmit ultrasound (transmission wave) to ultrasonic sensor 36. Signal transmitting circuit 32 includes an oscillation circuit that generates a rectangular wave at a predetermined frequency, and a driving circuit that drives ultrasonic sensor 36, for example. Signal transmitting circuit 32 is configured such that the driving circuit transmits a rectangular wave generated by the oscillation circuit to ultrasonic sensor 36 as a driving signal in response to a control signal received from controller 10. This causes ultrasonic sensor 36 to transmit a transmission wave at a transmission wave voltage gain (transmission gain) set by controller 10. When ultrasonic sensor 36 transmits the transmission wave in a state where an obstacle exists within an attainment range of the transmission wave, the transmission wave hits against and reflects off the obstacle, and then ultrasonic sensor 36 receives the reflected wave (ultrasound).

Signal receiving circuit 34 is configured to detect the reflected wave received by ultrasonic sensor 36 as an electric signal. Signal receiving circuit 34 includes an amplifier circuit that amplifies the reflected wave (electric signal) at a received wave signal gain (reception gain) set by controller 10, and a filter circuit that extracts an electric signal at a predetermined frequency, for example. Signal receiving circuit 34 amplifies and filters an electric signal output from ultrasonic sensor 36 in response to a control signal received from controller 10 to convert the electric signal into a reception signal. Signal receiving circuit 34 outputs the converted reception signal to controller 10.

When signal receiving circuit 34 outputs the reception signal, controller 10 calculates a distance from ultrasonic sensor 36 to the obstacle based on time from transmission of the transmission wave to reception of the reflected wave.

Depending on a mounted state (e.g., a mounted angle) of ultrasonic sensor 36 to vehicle 1, even when an obstacle actually exists behind a vehicle, the obstacle may not be correctly detected. For example, a transmission wave transmitted from ultrasonic sensor 36 may not hit against an obstacle, or even a transmission wave having hit against and reflected off an obstacle may not reach ultrasonic sensor 36. This causes a problem that a driver of vehicle 1 sometimes needs to actually check whether ultrasonic sensor 36 is correctly mounted. This kind of check operation is very troublesome.

In the present exemplary embodiment, controller 10 control execution of a self-diagnostic mode of determining whether ultrasonic sensor 36 is correctly mounted under predetermined environmental conditions where no obstacle exists behind a vehicle and a distance between ultrasonic sensor 36 and a position on a road surface, to which a transmission wave transmitted from ultrasonic sensor 36 attains, is constant. Controller 10 determines that vehicle 1 is under the predetermined environmental conditions according to the following: it is determined that vehicle 1 is travelling straight (moving forward) at a speed of 10 km/h or more in accordance with detection results of vehicle speed detector 22, gearshift detector 24, and steering angle detector 26; it is determined that a vehicle height is a reference value in accordance with a detection result of vehicle height detector 28; and it is determined that a road slope is about 0% in accordance with a detection result of posture detector 30, for example.

Figure 3:
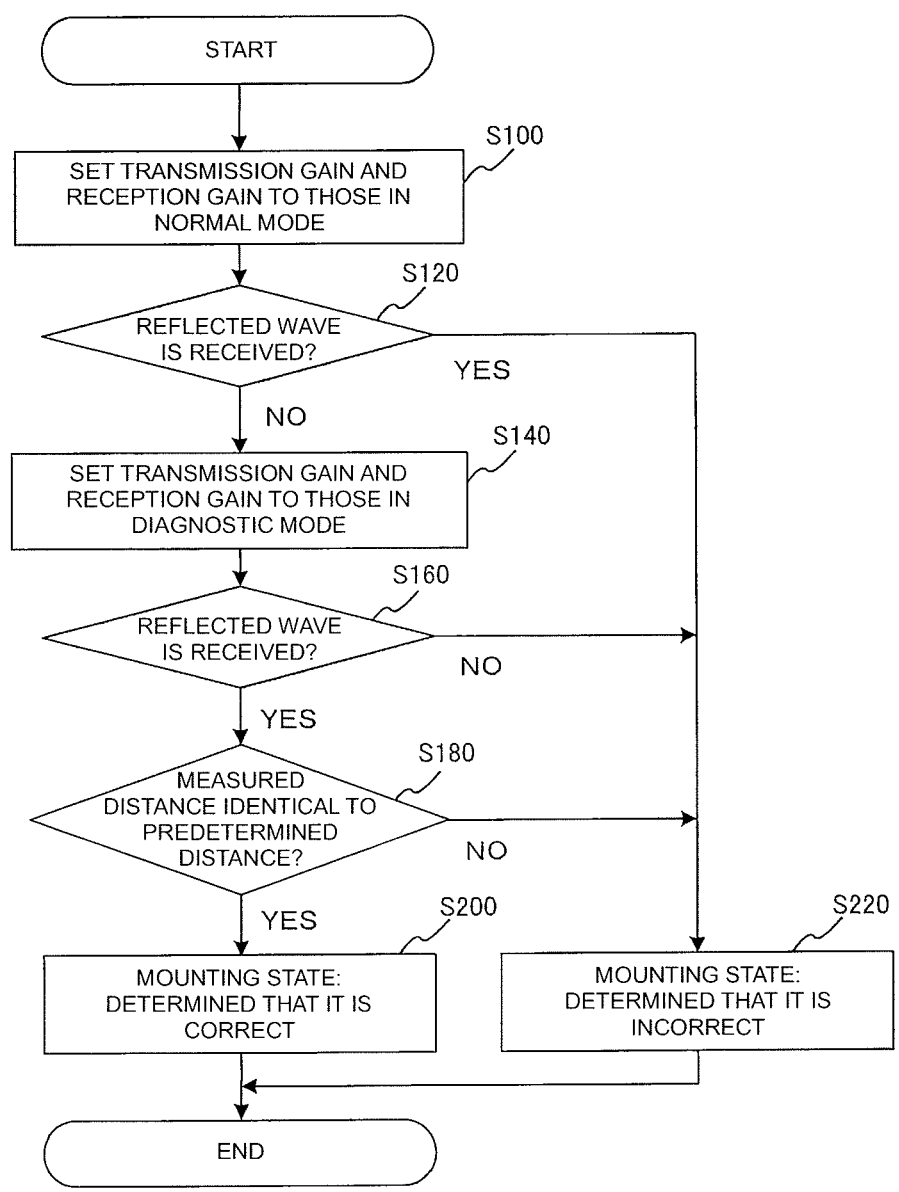
FIG. 3 is a flowchart illustrating operation to be performed in a self-diagnostic mode according to the exemplary embodiment of the present disclosure.

FIG. 3 is a flowchart illustrating operation to be performed in a self-diagnostic mode according to the present exemplary embodiment. Processing in step S100 in FIG. 3 starts when controller 10 determines that vehicle 1 is under the predetermined environmental conditions.

Figure 4A:
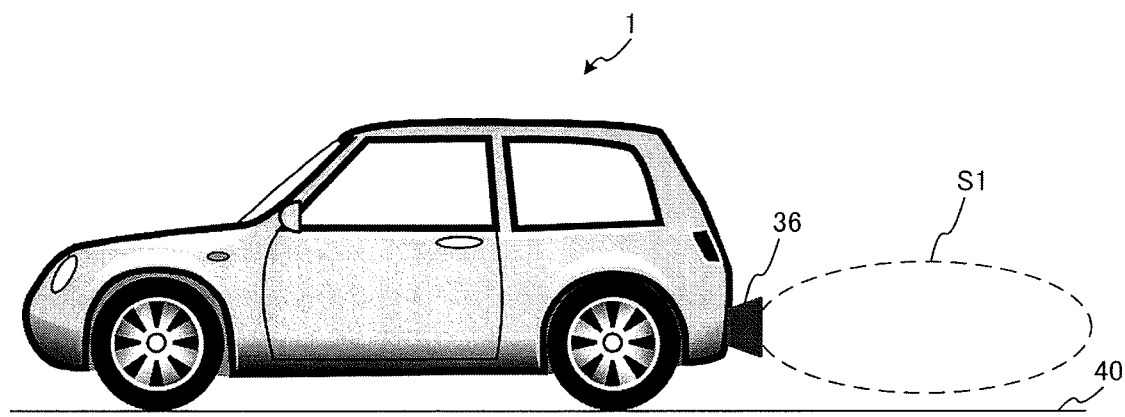
FIG. 4A illustrates a receivable range of a reflected wave by the ultrasonic sensor according to the exemplary embodiment of the present disclosure.

First, controller 10 controls signal transmitting circuit 32 and signal receiving circuit 34 so as to set a transmission gain of a transmission wave to be transmitted from ultrasonic sensor 36, and a reception gain of a reflected wave received by ultrasonic sensor 36, to those in normal mode at normal time to cause ultrasonic sensor 36 to operate (step S100). More specifically, the normal time represents a time when an obstacle existing behind a vehicle is actually detected using ultrasonic sensor 36. When ultrasonic sensor 36 operates in the normal mode as well as is correctly mounted, attainment range S1 of the transmission wave does not include road surface 40 as illustrated in FIG. 4A. As a result, no reflected wave is received by ultrasonic sensor 36.

Next, controller 10 determines whether ultrasonic sensor 36 receives a reflected wave (step S120). As a result of the determination, when ultrasonic sensor 36 receives the reflected wave (YES in step S120), controller 10 determines that ultrasonic sensor 36 is incorrectly mounted (step S220). When processing in step S220 is completed, ultrasound distance measurement ECU 5 finishes processing in FIG. 3.

Figure 4B:
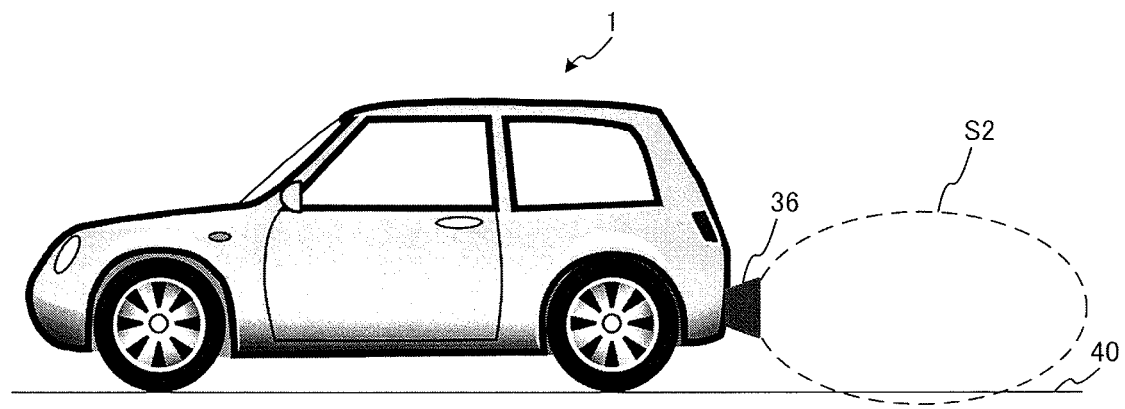
FIG. 4B illustrates a receivable range of a reflected wave by the ultrasonic sensor according to the exemplary embodiment of the present disclosure.

Meanwhile, when ultrasonic sensor 36 receives no reflected wave (NO in step S120), controller 10 controls signal transmitting circuit 32 and signal receiving circuit 34. This control causes a transmission gain of a transmission wave to be transmitted from ultrasonic sensor 36, and a reception gain of a reflected wave received by ultrasonic sensor 36, to be set to those in diagnostic mode, being more than those in the normal mode, to cause ultrasonic sensor 36 to operate (step S140). When ultrasonic sensor 36 operates in the diagnostic mode as well as is correctly mounted, attainment range S2 of the transmission wave includes road surface 40 as illustrated in FIG. 4B. As a result, a reflected wave reflected off road surface 40 is received by ultrasonic sensor 36.

Figure 5A:
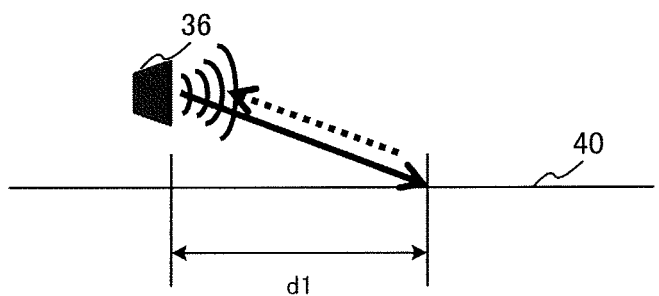
FIG. 5A illustrates change in measuring distance depending on a mounted state of an ultrasonic sensor.
Figure 5B:
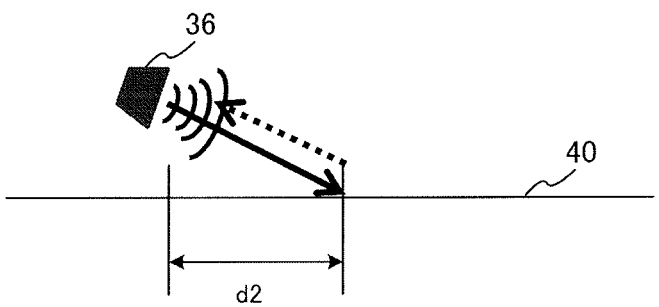
FIG. 5B illustrates change in measuring distance depending on a mounted state of the ultrasonic sensor.
Figure 5C:
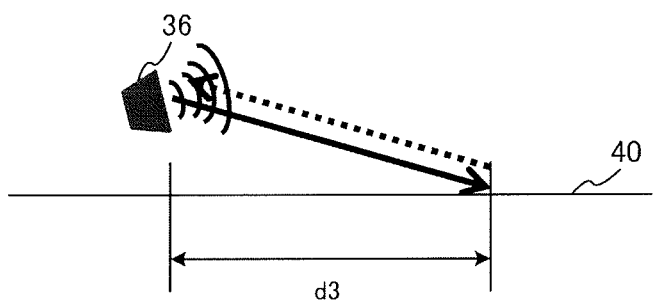
FIG. 5C illustrates change in measuring distance depending on a mounted state of the ultrasonic sensor.
Figure 5D:
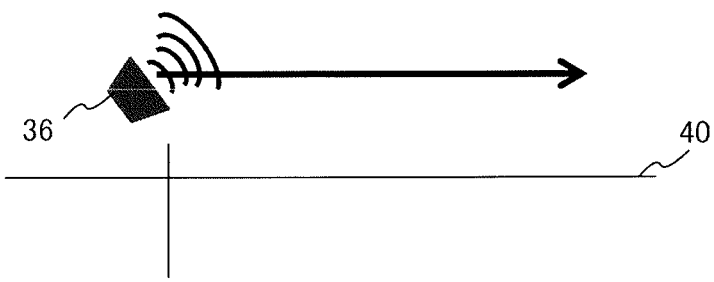
FIG. 5D illustrates change in measuring distance depending on a mounted state of the ultrasonic sensor.

Next, controller 10 determines whether ultrasonic sensor 36 receives the reflected wave (step S160). As a result of the determination, when ultrasonic sensor 36 receives no reflected wave (NO in step S160), controller 10 determines that ultrasonic sensor 36 is incorrectly mounted (step S220). When ultrasonic sensor 36 receives no reflected wave, it is assumed that ultrasonic sensor 36 may be mounted to vehicle 1 while being greatly inclined upward as illustrated in FIG. 5D.

Meanwhile, when ultrasonic sensor 36 receives the reflected wave (YES in step S160), controller 10 calculates a distance from ultrasonic sensor 36 to the obstacle based on time from transmission of the transmission wave to reception of the reflected wave. Then, controller 10 determines whether the calculated distance is identical to a predetermined distance (step S180). The predetermined distance is a distance d1 calculated by a preliminary experiment using ultrasonic sensor 36 as illustrated in FIG. 5A when vehicle 1 is under the predetermined environmental conditions and ultrasonic sensor 36 is correctly mounted.

As a result of the determination, when the calculated distance is not identical to the predetermined distance (NO in step S180), controller 10 determines that ultrasonic sensor 36 is incorrectly mounted (step S220). For example, it is assumed that ultrasonic sensor 36 is mounted to vehicle 1 while being inclined toward a road surface as illustrated in FIG. 5B to cause a distance d2 calculated to be less than the predetermined distance d1. Alternatively, it is assumed that ultrasonic sensor 36 is mounted to vehicle 1 while being inclined upward to cause a distance d3 calculated to be more than the predetermined distance d1 as illustrated in FIG. 5C.

Meanwhile, when a calculated distance is identical to the predetermined distance (YES in step S180), controller 10 determines that ultrasonic sensor 36 is correctly mounted (step S200). When processing in step S200 is completed, ultrasound distance measurement ECU 5 finishes processing in FIG. 3.

As described above in detail, ultrasound distance measurement ECU 5 includes the distance measurement section (controller 10), and the determination section (controller 10) in the present exemplary embodiment. The distance measurement section (controller 10) measures a distance to road surface 40 based on time from transmission of a transmission wave to reception of a reflected wave by ultrasonic sensor 36 that is mounted to vehicle 1 to transmit a transmission wave toward road surface 40 and receive a reflection wave reflected off road surface 40. The determination section (controller 10) determines not only that ultrasonic sensor 36 is correctly mounted when the distance measured by the distance measurement section is identical to the predetermined distance d1, but also that ultrasonic sensor 36 is incorrectly mounted when the distance measured by the distance measurement section is not identical to the predetermined distance d1.

The present exemplary embodiment configured as described above enables a driver to determine whether ultrasonic sensor 36 is correctly mounted without actually checking it.

While the above exemplary embodiment is described for an example in which when ultrasonic sensor 36 is operated in the diagnostic mode, both of a transmission gain of a transmission wave to be transmitted from ultrasonic sensor 36 and a reception gain of a reflected wave received by ultrasonic sensor 36 are set more than those in the normal mode, the present disclosure is not limited to this. For example, when ultrasonic sensor 36 is operated in the diagnostic mode, only one of a transmission gain of a transmission wave to be transmitted from ultrasonic sensor 36 and a reception gain of a reflected wave received by ultrasonic sensor 36 may be set more than that in the normal mode.

In addition, while the above exemplary embodiment is described for an example in which when ultrasonic sensor 36 is operated in the normal mode, both of a transmission gain of a transmission wave to be transmitted from ultrasonic sensor 36 and a reception gain of a reflected wave received by ultrasonic sensor 36 are set identical to those at the normal time, the present disclosure is not limited to this. For example, when ultrasonic sensor 36 is operated in the normal mode, only one of a transmission gain of a transmission wave to be transmitted from ultrasonic sensor 36 and a reception gain of a reflected wave received by ultrasonic sensor 36 may be set identical to that at the normal time.

While the above exemplary embodiment is described for an example in which one ultrasonic sensor 36 is mounted to a rear portion of vehicle 1, a plurality of ultrasonic sensors 36 may be mounted. Ultrasonic sensor 36 may be mounted to a front portion or a side portion of vehicle 1 other than the rear portion of vehicle 1. For example, when perimeter camera images show no obstacle around a vehicle, ultrasonic sensor 36 is not limited to that mounted to a rear portion of vehicle 1. Even ultrasonic sensor 36 mounted to a front portion or a side portion of vehicle 1 can be determined whether it is correctly mounted. When a vehicle travels at high speed (e.g., 60 km/h or more) on an expressway or the like, there is no obstacle 5 m ahead of the vehicle. Thus, even when ultrasonic sensor 36 is mounted to a front portion of vehicle 1, ultrasonic sensor 36 can be determined whether it is correctly mounted.

While the above exemplary embodiment is described for an example in which ultrasonic sensor 36, having both of a function of transmitting a transmission wave and a function of receiving a reflected wave reflected off an obstacle, is mounted to a rear portion of vehicle 1, the present disclosure is not limited to this. For example, an ultrasonic sensor having only a function of transmitting a transmission wave, and an ultrasonic sensor having only a function of receiving a reflected wave, may be mounted to respective rear portions of vehicle 1.

The above exemplary embodiment only shows a specific example when the present disclosure is practiced, and thus the technical scope of the present disclosure should not be interpreted in a limited way by the above exemplary embodiment. That is, the present disclosure can be practiced by various forms without departing from its sprit or essential features.

The present disclosure is useful as a sensor mounting state determination device and a sensor mounting state determination method, capable of allowing a driver to determine whether an ultrasonic sensor is correctly mounted without actually checking it.

What is claimed is:

1. A sensor mounting state determination device comprising:
a processor configured to control an ultrasonic sensor to operate in a normal mode or a self-diagnostic mode;
a memory storing a program that, when executed by the processor, causes the sensor mounting state determination device to:
determine whether a speed at which a vehicle travels is greater than or equal to a given speed, and in response to determining that the speed at which the vehicle travels is greater than or equal to the given speed, measure a distance from the ultrasonic sensor mounted on the vehicle to a road surface based on a time from when the ultrasonic sensor transmits a transmission wave toward the road surface until when the ultrasonic sensor receives as a reflected wave the transmission wave reflected off the road surface;
determine that the ultrasonic sensor is correctly mounted in response to determining that the measured distance is equal to a predetermined distance; and
determine that the ultrasonic sensor is incorrectly mounted in response to determining that the measured distance is not equal to the predetermined distance.

2. The sensor mounting state determination device according to claim 1, wherein the program, when executed by the processor, further causes the sensor mounting state determination device to:
control the ultrasonic sensor to transmit the transmission wave in the self-diagnostic mode at a transmission gain that is greater than a transmission gain used in the normal mode, and
determine that the ultrasonic sensor is incorrectly mounted in response to determining that the ultrasonic sensor does not receive the reflected wave.

3. The sensor mounting state determination device according to claim 1, wherein the program, when executed by the processor, further causes the sensor mounting state determination device to:
control the ultrasonic sensor to receive the reflected wave in the self-diagnostic mode at a reception gain that is greater than a reception gain used in the normal mode, and
determine that the ultrasonic sensor is incorrectly mounted in response to determining that the ultrasonic sensor does not receive the reflected wave.

4. The sensor mounting state determination device according to claim 2, wherein the program, when executed by the processor, further causes the sensor mounting state determination device to:
control the ultrasonic sensor to receive the reflected wave in the self-diagnostic mode at a reception gain that is greater than a reception gain used in the normal mode, and
determine that the ultrasonic sensor is incorrectly mounted in response to determining that the ultrasonic sensor does not receive the reflected wave.

5. The sensor mounting state determination device according to claim 1, wherein the program, when executed by the processor, further causes the sensor mounting state determination device to:
control the ultrasonic sensor to transmit the transmission wave at a transmission gain that is equal to a transmission gain that is used in the normal mode, and
determine that the ultrasonic sensor is incorrectly mounted in response to determining that the ultrasonic sensor receives the reflected wave.

6. The sensor mounting state determination device according to claim 1, wherein the program, when executed by the processor, further causes the sensor mounting state determination device to:
control the ultrasonic sensor to receive the reflected wave at a reception gain that is equal to a reception gain used in the normal mode, and
determine that the ultrasonic sensor is incorrectly mounted in response to determine that the ultrasonic sensor receives the reflected wave.

7. The sensor mounting state determination device according to claim 1, wherein the ultrasonic sensor is determined to be positioned at a predetermined angle with respect to the vehicle when the ultrasonic sensor is determined to be correctly mounted.

8. The sensor mounting state determination device according to claim 1, wherein the program, when executed by the processor, causes the sensor mounting state determination device to:
determine that the sensor mounting state determination device is operating in the self-diagnostic mode when the speed at which the vehicle travels is greater than or equal to the given speed.

9. A sensor mounting state determination method comprising:
determining whether a speed at which a vehicle travels is greater than or equal to a given speed;
in response to the determining that the speed at which the vehicle travels is greater than or equal to the given speed, transmitting a transmission wave from an ultrasonic sensor mounted on the vehicle toward a road surface;
receiving by the ultrasonic sensor the transmission wave reflected off the road surface as a reflected wave;
measuring a distance from the ultrasonic sensor to the road surface based on a time from the transmitting to the receiving;
determining that the ultrasonic sensor is correctly mounted in response to determining that the distance measured is equal to a predetermined distance; and
determining that the ultrasonic sensor is incorrectly mounted in response to determining that the measured distance is not equal to the predetermined distance.

10. The sensor mounting state determination method according to claim 9, further comprising:
determining that the ultrasonic sensor is incorrectly mounted in response to determining that the ultrasonic sensor does not receive the reflected wave.

11. The sensor mounting state determination method according to claim 10, further comprising:
determining whether the ultrasonic sensor is operating in a normal mode or a self-diagnostic mode;
controlling the ultrasonic sensor to receive the reflected wave in the self-diagnostic mode at a reception gain that is greater than a reception gain at used in the normal mode;

determining that the ultrasonic sensor does not receive the reflected wave; and in response to determining that the ultrasonic sensor does not receive the reflected wave, determining that the ultrasonic sensor is incorrectly mounted.

12. The sensor mounting state determination method according to claim 9, wherein:

the ultrasonic sensor operates in at least a normal mode and a self-diagnostic mode, the ultrasonic sensor receives the reflected wave in the self-diagnostic mode at a reception gain that is greater than a reception gain used in the normal mode, and the ultrasonic sensor is determined to be incorrectly mounted in response to determining that the ultrasonic sensor does not receive the reflected wave.

13. The sensor mounting state determination method according to claim 9, further comprising:

determining whether the ultrasonic sensor is operating in a normal mode or a self-diagnostic mode;

controlling the ultrasonic sensor to transmit the transmission wave at a transmission gain that is equal to a transmission gain that is used in the normal operation mode;

determining that the ultrasonic sensor receives the reflected wave; and in response to determining that the ultrasonic sensor receives the reflected wave, determining that the ultrasonic sensor is incorrectly mounted.

14. The sensor mounting state determination method according to claim 9, further comprising:

determining whether the ultrasonic sensor is operating in a normal mode or a self-diagnostic mode;

controlling the ultrasonic sensor to receive the reflected wave at a reception gain that is equal to a reception gain used in the normal mode;

determining that the ultrasonic sensor receives the reflected wave; and in response to determining that the ultrasonic sensor receives the reflected wave, determining that the ultrasonic sensor is incorrectly mounted.

15. A non-transitory computer-readable medium storing at least one program that, when executed by a computer, causes the computer to:

determine whether a speed at which the vehicle travels is greater than or equal to a given speed;

in response to determining that the speed at which the vehicle travels is greater than or equal to the given speed, measure a distance from an ultrasonic sensor mounted on the vehicle to a road surface based on a time from when the ultrasonic sensor transmits a transmission wave toward the road surface until when the ultrasonic sensor receives, as a reflected wave, the transmission wave reflected off the road surface;

determine that the ultrasonic sensor is correctly mounted in response to determining that the measured distance is equal to a predetermined distance; and determine that the ultrasonic sensor is incorrectly mounted in response to determining that the measured distance is not equal to the predetermined distance.

16. The computer-readable medium according to claim 15, wherein the at least one program, when executed by the computer, further causes the computer to:

determine whether the ultrasonic sensor is operating in a normal mode or a self-diagnostic mode;

control the ultrasonic sensor to transmit the transmission wave in the self-diagnostic mode at a transmission gain that is greater than a transmission gain used in the normal mode; and determine that the ultrasonic sensor is incorrectly mounted in response to determining that the ultrasonic sensor does not receive the reflected wave.

17. The computer-readable medium according to claim 16, wherein the at least one program, when executed by the computer, further causes the computer to:

control the ultrasonic sensor to receive the reflected wave in the self-diagnostic mode at a reception gain that is greater than a reception gain at used in the normal mode; and determine that the ultrasonic sensor is incorrectly mounted in response to determining that the ultrasonic sensor does not receive the reflected wave.

18. The computer-readable medium according to claim 15, wherein the at least one program, when executed by the computer, further causes the computer to:

determining whether the ultrasonic sensor is operating in a normal mode or a self-diagnostic mode;

control the ultrasonic sensor to receive the reflected wave in the self-diagnostic mode at a reception gain that is greater than a reception gain used in the normal mode; and determine that the ultrasonic sensor is incorrectly mounted in response to determining that the ultrasonic sensor does not receive the reflected wave.

19. The computer-readable medium according to claim 15, wherein the at least one program, when executed by the computer, further causes the computer to:

determine whether the ultrasonic sensor is operating in a normal mode or a self-diagnostic mode;

control the ultrasonic sensor to transmit the transmission wave at a transmission gain that is equal to a transmission gain that is used in the normal operation mode; and determine that the ultrasonic sensor is incorrectly mounted in response to determining that the ultrasonic sensor receives the reflected wave.

20. The computer-readable medium according to claim 15, wherein the at least one program, when executed by the computer, further causes the computer to:

determine whether the ultrasonic sensor is operating in a normal mode or a self-diagnostic mode;

control the ultrasonic sensor to receive the reflected wave at a reception gain that is equal to a reception gain used in the normal mode, and determine that the ultrasonic sensor is incorrectly mounted when the ultrasonic sensor receives the reflected wave.

* * * * *